(12) United States Patent
Wohlrab et al.

(10) Patent No.: US 7,186,111 B2
(45) Date of Patent: Mar. 6, 2007

(54) HYBRID INJECTION UNIT, AND INJECTION MOLDING MACHINE WITH A HYBRID INJECTION UNIT

(75) Inventors: Walter Wohlrab, Weissenburg (DE); Herbert Pickel, Neutraubling (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 366 days.

(21) Appl. No.: 10/825,403

(22) Filed: Apr. 15, 2004

(65) Prior Publication Data

US 2004/0213871 A1    Oct. 28, 2004

(30) Foreign Application Priority Data

Apr. 26, 2003    (DE) .................... 103 18 958

(51) Int. Cl.
*B29C 45/70*    (2006.01)

(52) U.S. Cl. ............... 425/542; 425/574; 425/595

(58) Field of Classification Search ........... 425/542, 425/574, 587, 595
See application file for complete search history.

(56) References Cited

U.S. PATENT DOCUMENTS

| | | | | |
|---|---|---|---|---|
| 4,693,676 A | * | 9/1987 | Inaba | 425/587 |
| 5,129,808 A | * | 7/1992 | Watanabe et al. | 425/587 |
| 5,217,725 A | * | 6/1993 | Inaba et al. | 425/145 |
| 5,261,810 A | * | 11/1993 | Kamp et al. | 425/451.9 |
| 5,540,495 A | * | 7/1996 | Pickel | 425/145 |
| 5,580,585 A | | 12/1996 | Holzschuh | |
| 5,679,384 A | * | 10/1997 | Emoto | 425/542 |
| 5,747,076 A | | 5/1998 | Jaroschek et al. | |
| 5,773,050 A | * | 6/1998 | Wohlrab | 425/595 |
| 6,247,622 B1 | | 6/2001 | Tokida et al. | |
| 6,368,095 B1 | * | 4/2002 | Chang | 425/542 |
| 6,530,774 B2 | * | 3/2003 | Emoto | 425/542 |

FOREIGN PATENT DOCUMENTS

| | | |
|---|---|---|
| DE | 43 44 335 C2 | 6/1995 |
| EP | 0 735 944 | 7/1998 |

(Continued)

OTHER PUBLICATIONS

F. Johannaber et al.: "Handbuch Spritzgiessen", hanser Verlag München, XP002300605, Nov. 13, 2001, p. 298, last paragraph; Fig. 7.171 and pp. 928-931.

*Primary Examiner*—James P. Mackey
(74) *Attorney, Agent, or Firm*—Henry M. Feiereisen

(57) ABSTRACT

A hybrid injection unit for an injection molding machine includes a plasticizing screw having a shaft and constructed for rotation and axial displacement. Operatively connected to the shaft is a first electric motor for rotating the plasticizing screw, and a second electric motor for axial displacement of the plasticizing screw. A cost-efficient construction of the second electric motor and reduced stress of the linkage between this electric motor and the shaft is realized by providing at least one piston and cylinder unit in fluid communication with a pressure source for support of the second electric motor in injection direction, and a traverse acted upon by one end of the piston and cylinder unit and rotatably supporting the shaft of the plasticizing shaft. The traverse acts upon the shaft between a force introduction point of the second electric motor into the shaft, on one hand, and the plasticizing screw, on the other hand.

10 Claims, 3 Drawing Sheets

FOREIGN PATENT DOCUMENTS

| | | |
|---|---|---|
| EP | 1 162 053 | 12/2001 |
| JP | 60 132721 | 7/1985 |
| JP | 04189525 A | 7/1992 |
| JP | 06 328532 | 11/1994 |
| JP | 11 138597 | 5/1999 |
| JP | 2000037755 | 2/2000 |

* cited by examiner

HYBRID INJECTION UNIT, AND INJECTION MOLDING MACHINE WITH A HYBRID INJECTION UNIT

CROSS-REFERENCES TO RELATED APPLICATIONS

This application claims the priority of German Patent Application, Serial No. 103 18 958.0-16, filed Apr. 26, 2003, pursuant to 35 U.S.C. 119(a)–(d), the disclosure of which is incorporated herein by reference.

BACKGROUND OF THE INVENTION

The present invention relates to a hybrid injection unit, and to an injection molding machine provided with a hybrid injection unit.

Injection molding machine typically include a clamping unit and a plasticizing or injection unit. The clamping unit normally includes at least two platens for attachment of the molding members or half-molds. As the half-molds are closed, a mold cavity is formed which receives plastic melt injected by the plasticizing unit. After the melt has cured, the clamping unit is opened and the molded article is removed from the cavity. The plasticizing unit transforms the initial material, such a plastic pellets, into a melt usually by applying energy such as shear energy. The melt accumulates in the screw end chamber of a cylinder and screw assembly. Plasticizing takes place as the plasticizing screw rotates in the plasticizing cylinder. Injection of plastic melt into the cavity is realized by moving the plasticizing screw forward in axial direction so that the melt in the screw end chamber is pushed into the cavity of the injection mold that forms part of the clamping unit.

The afore-described operations require the provision of several drives. The clamping unit has to be closed and opened. Moreover, the injection process requires application of a clamping pressure. The plasticizing screw for carrying out the plastification is caused to rotate by a suitable drive. In addition, the axial displacement of the plasticizing screw is realized by a drive. Many approaches have been proposed to date for implementing the various drives. One approach involves the use of a hydraulic drive for closing the clamping unit as well as applying the clamping pressure. Also the plasticizing screw of the plasticizing unit can be rotated and axially displaced by hydraulic means. More recently, the use of electric drives has been proposed for operating the clamping unit (oftentimes coupled with a toggle mechanism) as well as the plasticizing unit for driving the plasticizing screw. Electric drives are precise, easy to control and react and respond fairly quickly. Another approach involves combinations of hydraulic and electric drives for the plasticizing screw.

German Pat. No. DE 43 44 335 describes the use of two electric motors for driving the plasticizing screw. Both electric motors are constructed with two fixed stator and rotor assemblies. One of the electric motors is hereby intended to axially move the plasticizing screw via a spindle and nut combination, whereas the other electric motor is provided to rotate the plasticizing screw and has a rotor which is moveably linked via a multi-grooved portion with a spline shaft of the plasticizing screw. Both electric motors are operated completely separated from one another.

A problem associated with electric motors is the increased costs, especially when high-performance motors are involved. Although small electric motors, which may serve as direct motors, are relatively inexpensive, the costs for high torque motors increase exponentially with increase in torque. The same is true for nut and spindle assemblies which rise dramatically in costs as the size of the assembly increases. Costs increase significantly in particular when large plasticizing units are involved. Still, the use of electromotive drives is desired because of their precise operation.

It would therefore be desirable and advantageous to provide an improved injection unit which obviates prior art shortcomings and which is simple in structure and cost-effective, while still being reliable in operation.

SUMMARY OF THE INVENTION

According to one aspect of the present invention, a hybrid injection unit for an injection molding machine includes a plasticizing screw having a shaft and received in a plasticizing cylinder for rotation and displacement in an axial direction, a first electric motor operatively connected to the shaft of the plasticizing screw for implementing the rotation of the plasticizing screw, a second electric motor operatively connected to the shaft of the plasticizing screw for implementing the axial displacement of the plasticizing screw, a pressure source, at least one piston and cylinder unit operatively connectable to the pressure source for support of the second electric motor in injection direction, and a traverse acted upon by one end of the piston and cylinder unit and rotatably supporting the shaft of the plasticizing shaft, wherein the traverse acts upon the shaft between a force introduction point of the second electric motor into the shaft, on one hand, and the plasticizing screw, on the other hand.

The present invention resolves prior art problems by providing a separate piston and cylinder unit as hydraulic unit to assist the electric motor for axial displacement through intervention of a traverse for acting upon the shaft of the plasticizing screw. The pressure source for supply of hydraulic fluid may hereby form part of the injection unit or may be an external pressure source. The shaft of the plasticizing screw is hereby rotatably supported by the traverse and disposed between the force introduction point of the electric motor and the plasticizing shaft. This ensures that the electric motor for axial displacement and its linkage are not exposed to the entire injection force but merely to the force to be applied by the electric motor. The provision of a traverse allows the arrangement of several piston and cylinder units that act on the same traverse. For example, the use of two piston and cylinder units in opposite disposition is possible, whereby conventional hydraulic cylinders may be utilized. Also sealing problems within the plasticizing unit are no issue here.

According to another aspect of the present invention, an injection molding machine includes a hybrid injection unit which has a plasticizing screw with a shaft received in a plasticizing cylinder for rotation and displacement in an axial direction, a first electric motor operatively connected to the shaft of the plasticizing screw for implementing the rotation of the plasticizing screw, a second electric motor operatively connected to the shaft of the plasticizing screw for implementing the axial displacement of the plasticizing screw, at least one hydraulic piston and cylinder unit for controlled operation of the plasticizing screw, and further includes a mold clamping unit having at least two platens moveable relative to one another, and a pressure source operatively connectable to the hydraulic piston and cylinder unit and operatively connected to the mold clamping unit.

An advantage of an injection molding machine according to the present invention is the use of a single pressure source for the hydraulic force assist for the plasticizing unit as well as for the operation of the clamping unit, be it for opening and closing the clamping unit and/or build up of the clamping pressure. The use of a single pressure source is made possible by the recognition that the hydraulic force assist and the operation of the clamping unit occur at different time instances. For example, there is no need to apply a clamping pressure or to carry out the injection process, when the platens of the clamping unit are closed or opened. Application of clamping pressure takes place immediately after closing the clamping unit and can be maintained through use of a control valve without operation of the pressure source. When the injection process is initiated, there is no need to apply a clamping pressure so that the pressure source can now be used for assisting the operation of the plasticizing unit.

According to another feature of the present invention, the pressure source may include a pump, and a speed-controlled electric motor for driving the pump. In this way, pressure and volume of hydraulic fluid, e.g. oil, can be controlled in a superior manner so that a precise control of fluid pressure and conveying volume can be realized for each intended operation, i.e. closing of the clamping unit, application of the clamping pressure and assist of the plasticizing unit.

According to another feature of the present invention, the other end of the piston and cylinder unit is supported by a housing, or the piston and cylinder unit may have at least one portion formed integral with the housing.

According to another feature of the present invention, the first electric motor for rotating the plasticizing screw may be constructed as direct motor having a rotor mounted in fixed rotative engagement with the shaft of the plasticizing screw. Suitably, the rotor is connected with the shaft of the plasticizing screw for displacement in axial direction.

According to another feature of the present invention, the shaft of the plasticizing screw may have a portion constructed as a spindle, and a nut is mounted on the spindle and directly operated by the rotor of the second electric motor for effecting the axial displacement of the plasticizing screw. Suitably, the combination of the nut and the spindle may be constructed as a planetary roller mechanism. Advantageously, the piston and cylinder unit can be disposed in substantial parallel relationship to the combination of the nut and the spindle.

According to another feature of the present invention, the clamping unit may include a spindle and nut assembly for opening and closing operations, and a hydraulic motor for driving the spindle and nut assembly, whereby the hydraulic motor is operatively connected to the pump of the pressure source for rotation of the spindle or nut in both rotation directions. In this way, the clamping unit can be operated with little amount of hydraulic fluid, and the use of an electric motor and pump unit of relatively low performance for a large-scale injection molding machine is made possible in combination with electric motors for rotation and axial displacement of the plasticizing screw. Thus, inexpensive parts can be used, even when a large-scale injection molding unit is involved, without adversely affecting the overall quality of the operation.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
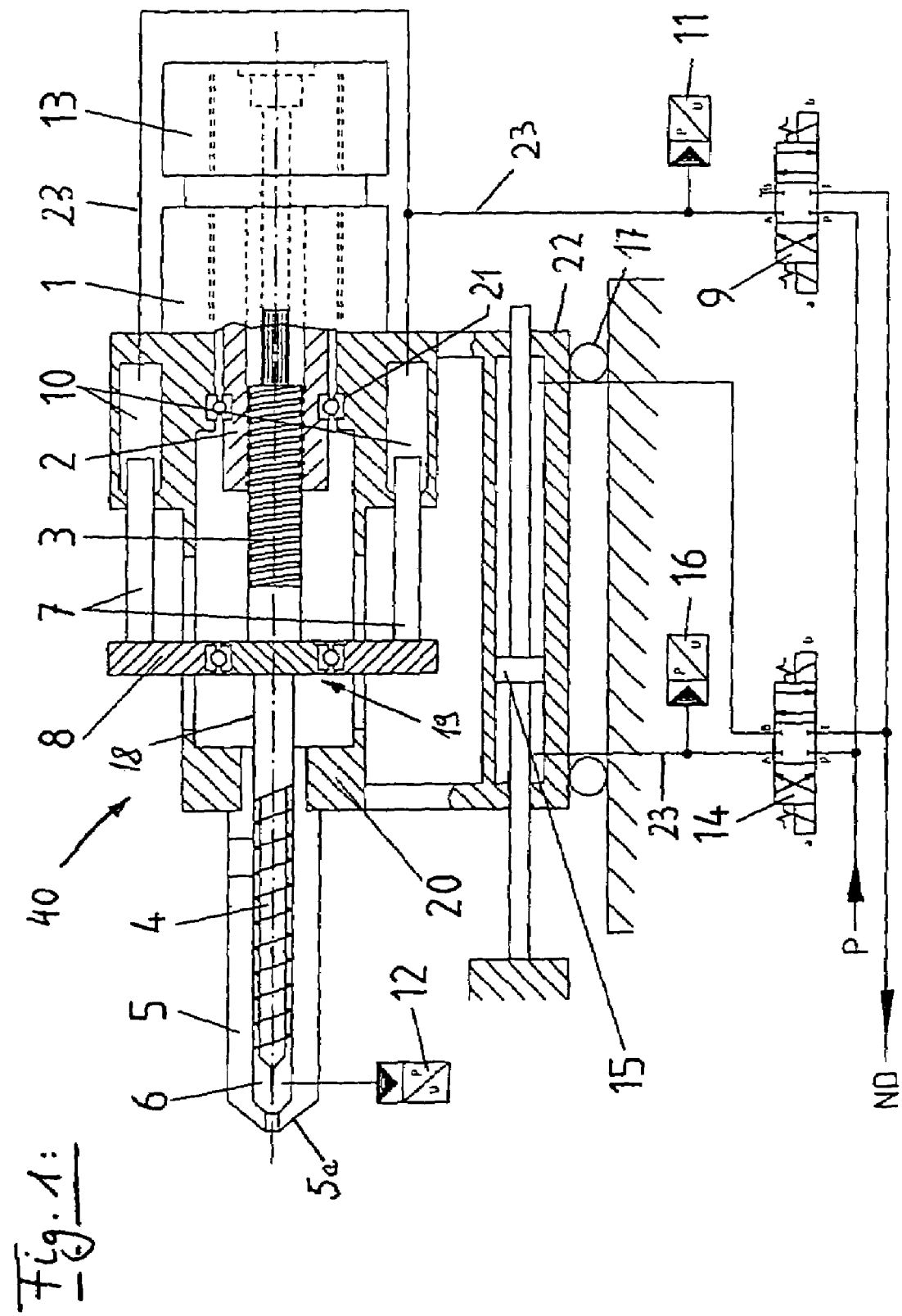
FIG. 1 is a schematic illustration of a hybrid injection unit according to the present invention, forming one part of an injection molding machine.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2A:
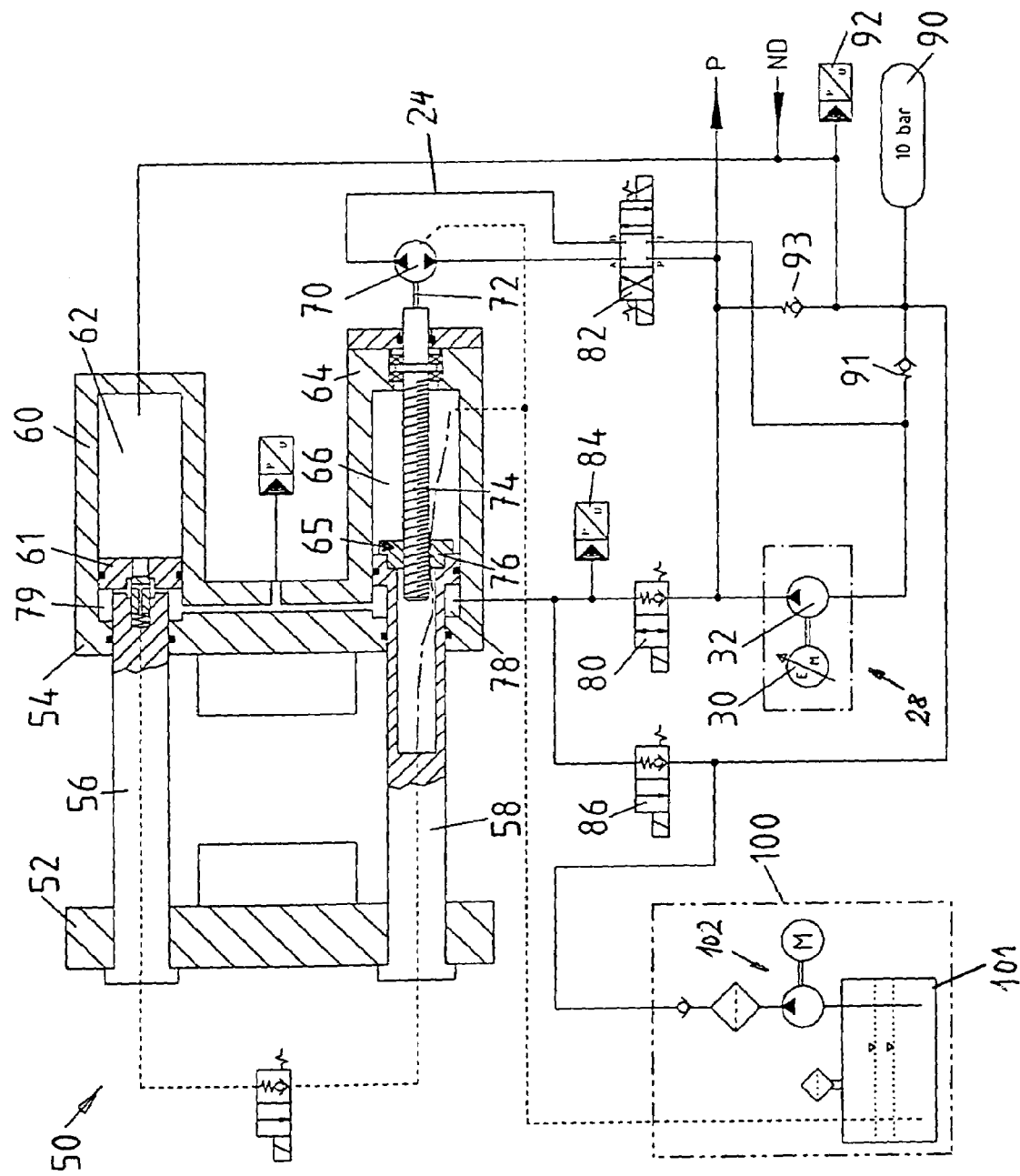
FIG. 2a is a schematic illustration of a first embodiment of a clamping unit according to the present invention, forming another part of the injection molding machine.
Figure 2B:
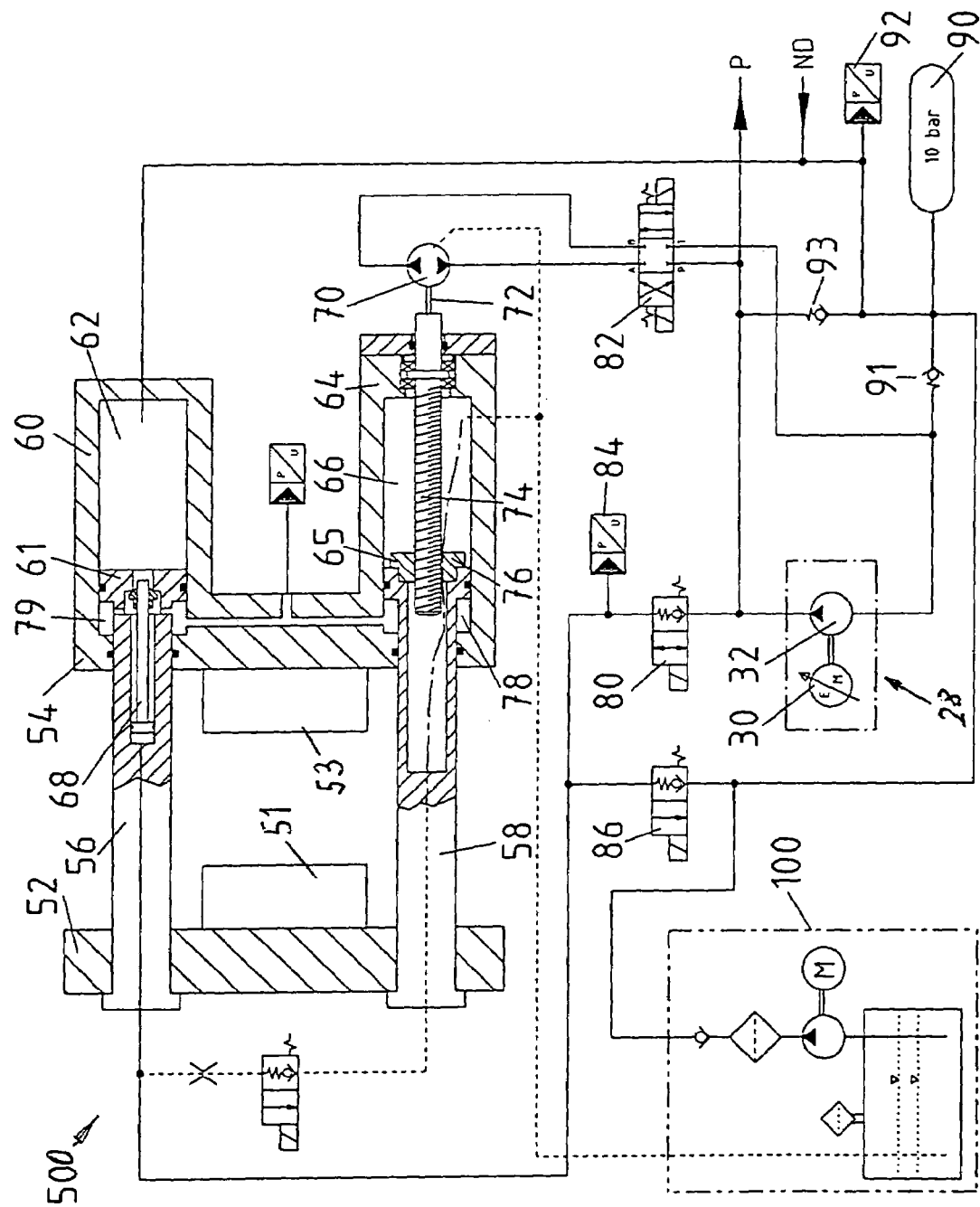
FIG. 2b is a schematic illustration of a second embodiment of a clamping unit according to the present invention.

Turning now to the drawing, and in particular to FIG. 1, there is shown a schematic illustration of a hybrid injection unit according to the present invention, forming one part of an injection molding machine and including a plasticizing unit, generally designated by reference numeral 40. Another part of the injection molding machine is shown in FIG. 2a or FIG. 2b and involves the clamping unit, generally designated by reference numeral 50, whereby the plasticizing unit 40 and the clamping unit 50 are connected to one another by hydraulic conduits at points P and ND.

The plasticizing unit 40 includes a housing 20 and a plasticizing cylinder 5 which is secured to the housing 20 and has accommodated therein a plasticizing screw 4. The housing 20 is supported on rollers 17 for movement on a support surface. The plasticizing screw 4 is able to rotate and to move in axial direction to change plastic pellets into a plastic melt which accumulates in a leading screw end chamber 6 before being injected into an injection mold. The pressure in the screw end chamber 6 is measured by a pressure sensor 12 which is operatively connected to a control unit (not shown).

At its trailing end, the plasticizing screw 4 connects into a shaft 18 which extends through the housing 20. Disposed at the rear end of the housing 20 is an assembly of two electric motors, namely a first electric motor 13 having a rotor with a cylindrical bushing which projects out to the left in FIG. 1 and is formed at its forward end with a multi-grooved bore for receiving a splined pin formed at the rearward end of the plasticizing screw 4. The splined pin is held in the multi-grooved bore for axial movement so that the plasticizing screw 4 can be moved in axial direction in relation to the electric motor 13. The rotor of the electric motor 13 and the shaft 18 of the plasticizing screw 4 are connected in fixed rotative engagement so as to allow a rotation of the plasticizing screw 4 by means of the electric motor 13.

Disposed directly upon the housing 20 is a second electric motor 1 which includes a hollow-shaft rotor having a recess for engagement by the bushing of the electric motor 13. The hollow-shaft rotor of the electric motor 1 includes a spindle nut 2 which projects into the housing 20 and interacts with a spindle portion 3 of the shaft 18 through intervention of balls (not shown). This spindle portion 3 of the shaft 18 establishes together with the balls and the spindle nut 2 a ball screw mechanism, whereby the spindle nut 2 is supported in the housing 20 via suitable bearings 21.

Operation of the electric motor 1 advances the plasticizing screw 4 through interaction of the spindle nut 2 and spindle portion 3 in axial direction forwards (injection movement) or backwards. Integrated in the housing 20 and disposed outside the spindle-nut arrangement 2, 3 are two hydraulic cylinders for accommodating piston units 7. The piston units 7 extend forwards against a traverse 8 which is supported by a bearing assembly 19 upon the shaft 18 of the plasticizing screw 4.

The housing 20 has a lower end constructed to define a hydraulic cylinder 22 for accommodation of a double-acting piston 15 by which the entire injection unit can be moved in axial direction during operation.

Each cylinder and piston assembly 7 has a pressure chamber 10 which can be supplied with hydraulic fluid, e.g. oil, via a hydraulic conduit 23. Disposed in the hydraulic conduit 23 is a control valve 9 which can connect to a pressure source, generally designated by reference numeral 28 (FIG. 2a or FIG. 2b) or to a low-pressure reservoir 90 (FIG. 2a or FIG. 2b). A further control valve 14 controls the operation of the double-acting piston 15 by regulating a flow of hydraulic fluid from the pressure source 28 to both pressure chambers in dependence on the direction of movement of the piston 15. In other words, the control valve 14 controls the movement of the entire injection unit forwards (to the left in FIG. 1) or backwards (to the right in FIG. 1) in relation to the clamping unit, i.e. away or toward the injection unit. In order to monitor the entire operation, pressure sensors 11, 16 are provided to measure the pressure in the hydraulic conduits 23 and to transmit corresponding signals to a controller (not shown).

Turning now to FIG. 2a, there is shown a schematic illustration of a first embodiment of a clamping unit according to the present invention, generally designated by reference numeral 50 and forming another part of the injection molding machine. The clamping unit 50 includes two platens 52, 54 for attachment of half-molds 51, 53 and is shown here in open state. Both platens 52, 54 are interconnected by two upper tie rods 56 and two lower tie rods 58 (only one upper tie rod 56 and one lower tie rod 58 are visible here). The tie rods 56, 58 are typically disposed diagonally opposite to one another and extend through the platen 52 for support thereof, while being moveably supported in the platen 54. The platen 54 is constructed to define integral upper and lower hydraulic cylinders 62, 64, with each of the upper hydraulic cylinders 62 accommodating a double-acting piston 61 which is formed at the trailing end of the tie rod 56. Likewise, each of the lower tie rods 58 includes a double-acting tie rod, generally designated by reference numeral 65 and constructed at the same time to form a nut 76. The nut 76 forms part of a nut and spindle assembly whose other part is a spindle 74 which is supported coaxially in the hydraulic cylinder 64 of the lower tie rod 64 and operated by a hydraulic motor 70 via a shaft 72.

Operation of the hydraulic shaft 70 causes the spindles 74 in the hydraulic cylinders 66 of the lower tie rods 58 to rotate to thereby move the platens 52, 54 to one another or away from one another.

The hydraulic motor 70 is connected to the pressure source 28 via hydraulic conduits 24 and a 4/3 control valve 82. The pressure source 28 can further be connected via a control valve 80 with a pressure chamber 78 of the hydraulic cylinder 64 of the lower tie rods 58, and thereby supply hydraulic fluid at the same time to a pressure chamber 79 for the piston 61 in the hydraulic cylinders 60 of the upper tie rods 56. The pressure chambers 78, 79 can further be connected via a control valve 86 with the low-pressure reservoir 90 which is supplied via a secondary pressure generating unit 100 comprised of a hydraulic reservoir 101 and a motor-pump assembly 102.

As further shown in FIG. 2a, the pressure source 28 is comprised of a pump 32 and a speed-controlled electric motor 30 for operating the pump 32. A flow rate of the pump 32 can be precisely determined through appropriate operation of the electric motor 30.

FIG. 2b shows a schematic illustration of a second embodiment of a clamping unit according to the present invention, generally designated by reference numeral 500. Parts corresponding with those in FIG. 2a are denoted by identical reference numerals and not explained again. The description below will center on the differences between the embodiments. In this embodiment, provision is made for integration of a pressure intensifier 68 in the upper tie rods 56 for assisting a movement of the moving platen 54 in conjunction with the pressure chamber 78.

The mode of operation of the clamping unit 50, 500 and the injection unit 40 is as follows: When intending to move the clamping unit 50, 500 from the open position, as shown in FIGS. 2a, 2b into a closed position, the speed-controlled electric motor 30 of the pressure source 28 is activated and the 4/3 control valve 82 is switched to operate the hydraulic motor 70 to thereby cause the spindle 74 to rotate. As a consequence of the interaction between the spindle 74 and the nut 74, both platens 52, 54 are moved toward one another. When both half-molds 51, 53 abut one another, the clamping pressure is applied by admitting hydraulic fluid to the pressure chambers 78, 79 through respective switching of the control valve 80, and activating the electric motor 30. As a result, both double-acting pistons 61, 65 are pushed to the right. Once the required clamping pressure is applied, control valve 80 closes.

It will be appreciated by persons skilled in the art that the clamping unit 50, 500 assumes further operations which have not been described here for the sake of simplicity as they are secondary to the present invention.

As the clamping unit 50, 500 closes and applies the clamping pressure, the screw end chamber 6 is filled with melt as the plasticizing screw 4 is caused to rotate by the electric motor 13. As the screw end chamber 6 is filled with plastic melt, the plasticizing screw 4 is pushed backwards. The electric motor 1 is switched off so that a rearward movement by the plasticizing screw 4 in axial direction is not interfered with. Optionally, the electric motor 1 may even be configured for support of the rearward movement by the plasticizing screw 4.

When plastic melt should be injected from the screw end chamber 6 into the cavity of the injection mold as defined by the half-molds 51, 53, the injection unit 40 is moved to approach the clamping unit 50, 500 by admitting hydraulic fluid into the left-hand pressure chamber of the double-acting piston 15 through proper switching of the control valve 14 and by energizing the electric motor 30 of the pressure source 28 to activate the pump 32. As a result, the housing 20 is moved in the direction of the clamping unit 50, 500 for docking the nozzle tip 5a of the plasticizing cylinder 5. Once this position of the housing 20 has been reached, control valve 14 closes and injection of plastic melt may commence.

During the injection process, the electric motor 1 is energized to move the plasticizing screw 4 in axial direction. Control valve 9 is switched suitably to supply pressure to the pressure chambers 10 of the piston and cylinder assemblies integrated in the housing 20 so that the pistons 7 are pushed forwards to act via the traverse 8 upon the shaft 18 of the plasticizing screw 4. The forces of the piston and cylinder assemblies are hereby added to the force applied by the electric motor 1, while the precision of movement is maintained as the electric motor 1 can be controlled in a precise manner. It is even possible that the electric motor 1 produces a force to oppose the hydraulic force. The rotary degree of freedom of the shaft 18 of the plasticizing screw 4 in relation to the traverse 8 is realized by the bearing assembly 19.

After the injection process, the injection unit 40 is moved backwards by admitting hydraulic fluid to the right-hand pressure chamber of the piston and cylinder assemblies in the lower housing portion 22 through respectively switching the control valve 14 so as to move the double-acting piston 15 in the other direction. At the same time, plastic melt can be produced by the plasticizing screw 4 and conveyed to the screw end chamber 6. As the screw end chamber 6 is filled, the plasticizing screw 4 is pushed back again. Hydraulic fluid, such as oil, may hereby return to the low-pressure reservoir 90 through appropriate switching of the control valve 9. The electric motor 1 may also be used to assist a suitable control of pressure conditions in the screw end chamber 6.

Following a rearward movement of the injection unit 40 and a suitable cool-down phase, the clamping pressure in the pressure chambers 78, 79 of the clamping unit 50, 500 is relieved by switching the control valve 86 so that the platens 52, 54 can move away from one another as the spindle 74 rotates in opposite direction through operation of the hydraulic motor 70 and suitable switching of the control valve 82.

As described above, the pressure source 28, comprised of pump 32 and speed-controlled electric motor 30, is a relevant feature of the present invention and involved in almost all operations, including closing and opening of the clamping unit 50, 500, applying the clamping pressure, moving the injection unit 40, and injection process. As a result of the afore-described construction of the injection molding machine in accordance with the invention, components of the spindle and nut assemblies, 2, 3 and the electric motor 30 can be dimensioned comparably weaker. The pressure source 28, comprised of pump 32 and electric motor 30, can thus operate efficiently, and the electric motor 30 also enables a precise control of pressure and volume. Taking into account the provision of precisely controllable electric motors 1, 13, a very accurate overall operation of the injection unit can be assured, despite the provision of a hydraulic assist.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An injection molding machine, comprising:
   a hybrid injection unit, including
      a plasticizing screw having a shaft and received in a plasticizing cylinder for rotation and displacement in an axial direction,
      a first electric motor operatively connected to the shaft of the plasticizing screw for implementing the rotation of the plasticizing screw,
      a second electric motor operatively connected to the shaft of the plasticizing screw for implementing the axial displacement of the plasticizing screw, and
      at least one hydraulic piston and cylinder unit for controlled operation of the plasticizing screw;
   a mold clamping unit having at least two platens moveable relative to one another; and
   a single hydraulic pressure source operatively connected to the hydraulic piston and cylinder unit to assist operation of the plasticizing screw and operatively connected to the mold clamping unit to assist operation of the mold clamping unit.

2. The injection molding machine of claim 1, and further comprising at least one piston and cylinder unit operatively connected to the pressure source for applying a clamping pressure for the clamping unit.

3. The injection molding machine of claim 1, wherein the clamping unit includes a spindle and nut assembly for opening and closing operations, and a hydraulic motor for driving the spindle and nut assembly, said hydraulic motor being operatively connected to a pump of the pressure source for rotation of the spindle or the nut in both rotation directions.

4. The injection molding machine of claim 1, wherein the first electric motor for rotating the plasticizing screw is constructed as direct motor having a rotor connected in fixed rotative engagement with the shaft of the plasticizing screw.

5. The injection molding machine of claim 4, wherein the rotor is connected with the shaft of the plasticizing screw for axial displacement.

6. The injection molding machine of claim 1, wherein the shaft of the plasticizing screw has a portion constructed as a spindle, forming part of a spindle and nut assembly whose other part is a nut mounted on the spindle and directly operated by a rotor of the second electric motor for effecting the axial displacement of the plasticizing screw.

7. The injection molding machine of claim 6, wherein the spindle and nut assembly is constructed as a ball screw mechanism.

8. The injection molding machine of claim 6, wherein the piston and cylinder unit is disposed in substantial parallel relationship to the spindle and nut assembly.

9. The injection molding machine of claim 1, and further comprising a traverse acted upon by one end of the piston and cylinder unit and rotatably supporting the shaft of the plasticizing screw, and at least one further said piston and cylinder unit acting upon the traverse.

10. The injection molding machine of claim 1, wherein the pressure source has a pump, and a speed-controlled electric motor for driving the pump.

* * * * *